Dec. 8, 1931.  A. L. HESTON  1,835,986
COLLAPSIBLE TIRE BUILDING FORM
Filed Oct. 12, 1927   3 Sheets-Sheet 1
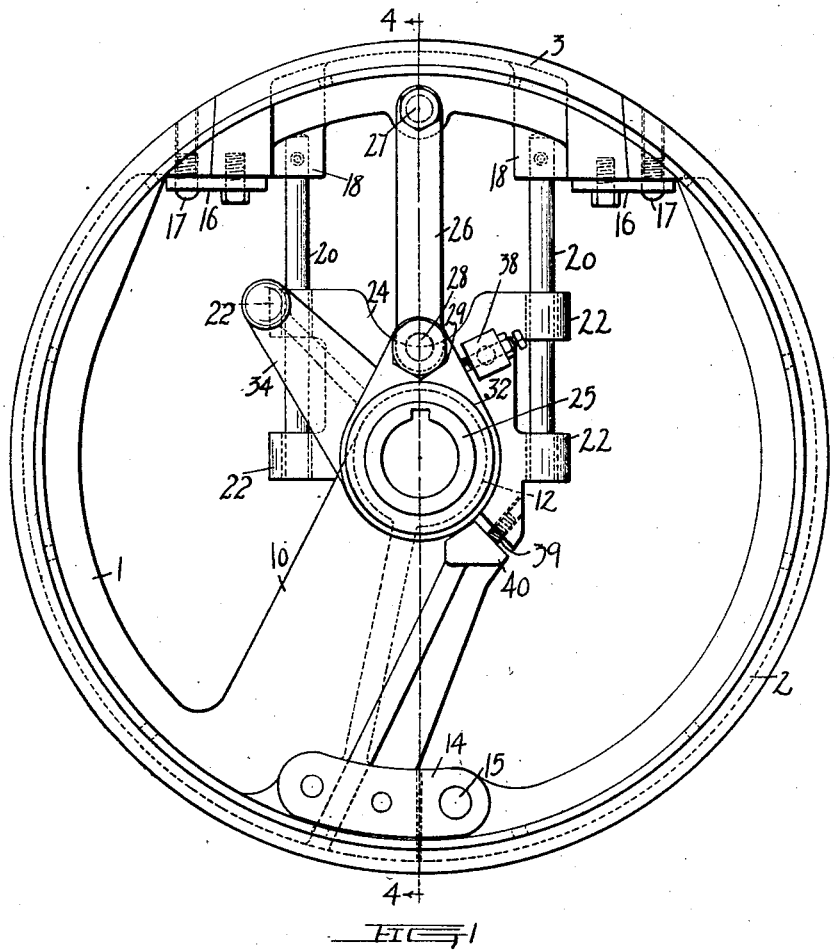
INVENTOR.
Allen L. Heston.
BY Ely & Barrow
ATTORNEYS.

Dec. 8, 1931.  A. L. HESTON  1,835,986
COLLAPSIBLE TIRE BUILDING FORM
Filed Oct. 12, 1927   3 Sheets-Sheet 2
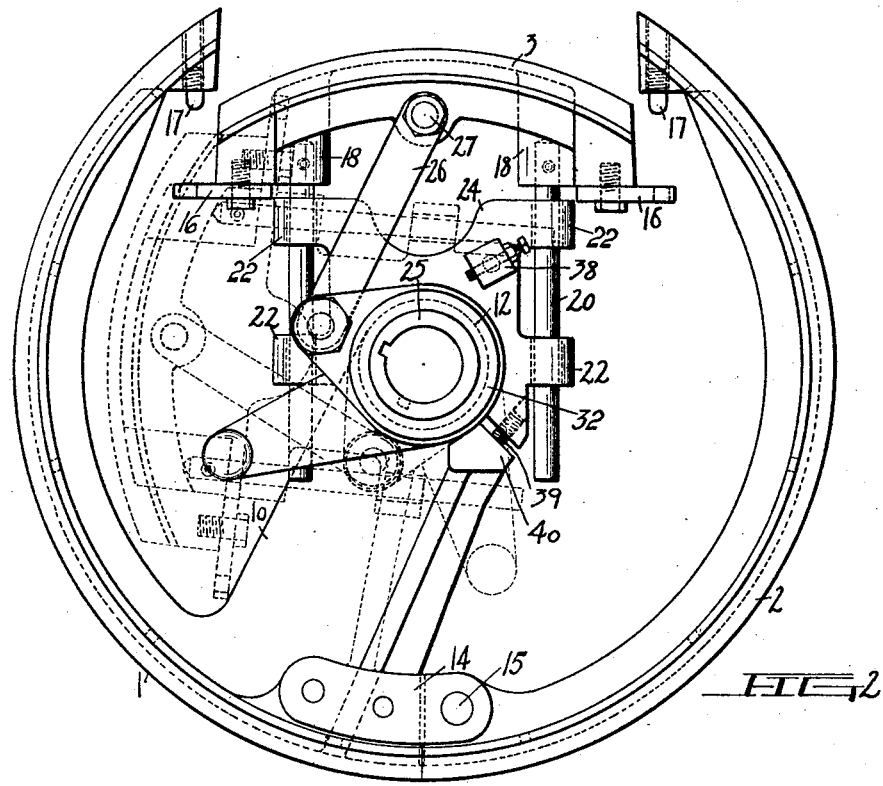
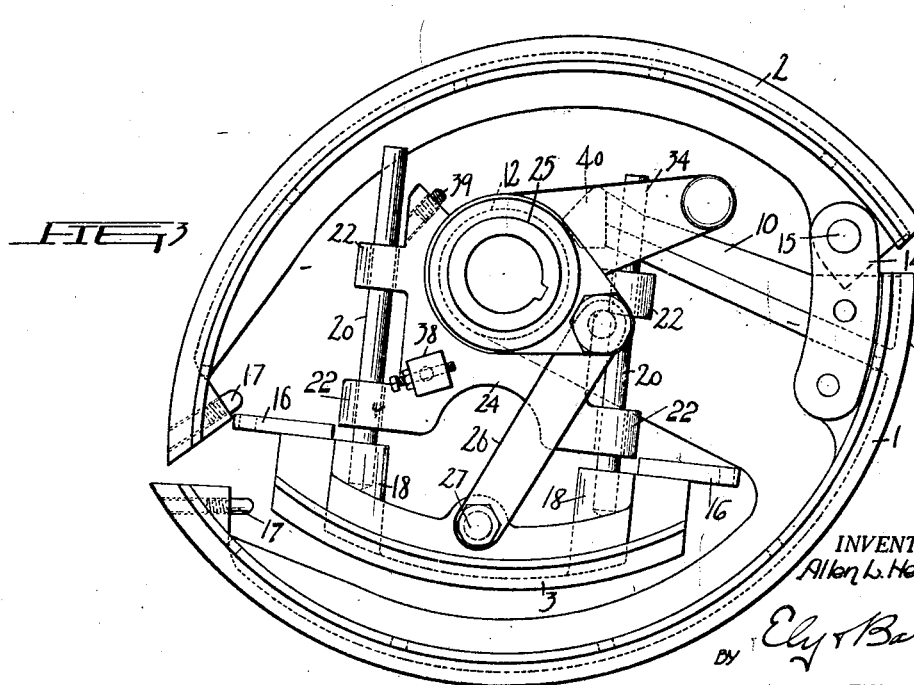
INVENTOR.
Allen L. Heston.
BY Ely & Barrow
ATTORNEYS.

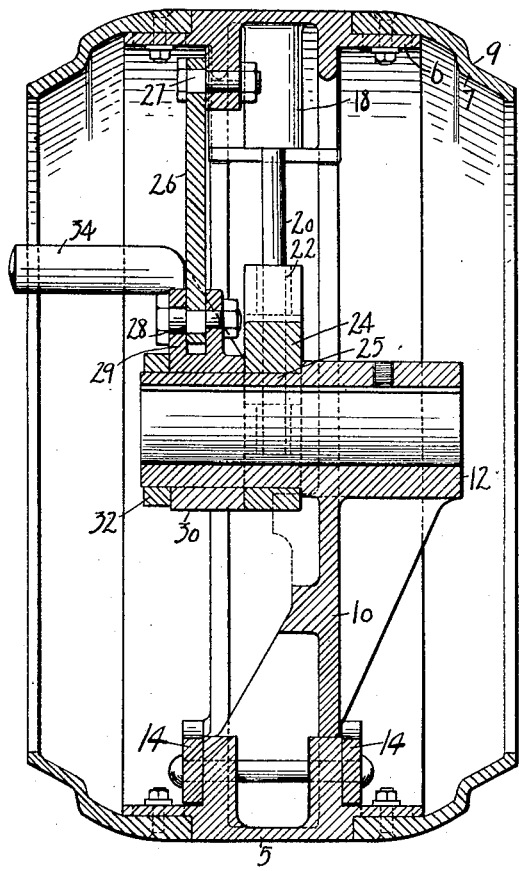

Patented Dec. 8, 1931

1,835,986

UNITED STATES PATENT OFFICE

ALLEN L. HESTON, OF COLUMBIANA, OHIO, ASSIGNOR, BY MESNE ASSIGNMENTS, TO NATIONAL RUBBER MACHINERY COMPANY, OF AKRON, OHIO, A CORPORATION OF OHIO

COLLAPSIBLE TIRE BUILDING FORM

Application filed October 12, 1927. Serial No. 225,694.

This invention relates to a new and improved form of tire building form or drum such as is used in the manufacture of tires by the flat band or pulley method. Although the principles of the invention may be applied to the construction of other forms or cores used in other methods of tire manufacture, it is particularly designed for use in the drum building of tires.

In the manufacture of straight side tires having inextensible beads incorporated in the edges of the carcass, it is the practice to provide the drum with depressed bead seats about its edges which afford locations for the beads of the tire. It is therefore necessary, in the manufacture of tires by this method to provide a collapsing mechanism by means of which the drum can be collapsed after the tire is completed to permit the removal of the completed carcass. With tires of small rim diameters it is difficult to arrange a collapsing mechanism which will permit a sufficient reduction in the bulk of the form to allow of its removal in collapsed condition through the center of the tire. It is the object of the present invention to construct a collapsible drum which shall have a maximum collapsing movement. It is also an object of the invention to design a collapsing mechanism which is simple and easy to operate and which will secure new and useful results in this art. The invention is not limited to use on forms having depressed bead seats or for use in the manufacture of straight side tires only.

While numerous forms of collapsing mechanism for tire building forms and tire building drums have been known and used before the invention of the present drum, none of them have to my knowledge, obtained the reduction in the drum which is accomplished by the present invention. In fact, the present device operates upon a new and distinctive principle or mode of operation as will be understood by the description and drawings constituting the present disclosure, and it is consequently not intended to limit the claims to exact conformity with the details as described, for the invention may be modified and altered within the scope of the invention as set forth in the claims.

In the drawings in which the preferred form of the invention is shown,

Figure 1 is a side elevation of the drum in expanded or erected position;

Figure 2 is a similar view showing the drum after the preliminary collapsing movement, a further movement being shown in dotted lines;

Figure 3 is a side view of the drum in completely collapsed position, the drum having been rotated slightly; and Figure 4 is a section along the axis of the drum on the line 4—4 of Figure 1.

As shown and described herein, the drum is composed of three sections, although the principles of the invention may be employed in a drum having a greater number of sections, if desired.

As shown, the drum has a sufficient collapsing range to permit the manufacture of tires having the smallest rim or bead diameters at present in use.

The sections are indicated by the numerals 1, 2 and 3, the section 1 being designated as a fixed section, the section 2 as a hinged section, and the section 3 as a separable or key section. When the sections are in erected or expanded condition they constitute a complete or full circle. Each section is provided with a raised central rib 5 which constitutes a portion of the cylindrical or "flat" surface upon which the tire is to be built, and wings or flanges 6 depressed from the level of the rib 5 and affording means for a detachable mounting of sectional rings 7 which constitute the portion of the drum upon which the edges of the carcass are shaped. The rings are provided with the depressed bead seats 9. It is apparent that the drum can be adjusted for bands of different widths or for different methods of tire building by substitution of different rings upon the drum sections.

The section 1 is provided with an inwardly extending arm 10 which is formed with a hub 12 which is located at the axis of the drum, being designed for attachment to the central rotary shaft of the tire building machine or stand. To the end of the section 1 adjacent the arm 10 are attached plates 14 which extend beyond the section 1 and support a pivot pin 15 about which the section 2 is movable from the position shown in Figure 2 to that shown in Figure 3, after the key section is removed.

The key section 3 is tapered outwardly to permit its withdrawal in a radial direction toward the axis of the core and is provided with overlapping plates 16 which fit over pins 17 at the extremities of the sections 1 and 2, serving to tie the sections of the drum together when in expanded condition. On either side of the section 3 are located bosses 18 in which are secured guide rods 20 which extend toward the center of the form and are arranged to pass on either side of the hub 12. These guide rods are received in parallel guiding arms 22 which are formed upon a sleeve 24 rotatably mounted on a reduced bearing 25 on the hub.

The key section is moved toward and from the axis of the form by a link 26 pivoted at its outer end to the key section at 27 and at its inner end at 28 to an arm 29 formed upon an operating sleeve 30 also mounted upon the reduced bearing 25. The two rotatable sleeves 24 and 30 are confined by a collar 32 on the end of the hub. The operating sleeve is also provided with an operating crank or handle 34 by which the sleeve may be rotated. An adjustable stop 38 on the sleeve or guide plate 24 limits the relative movement of the sleeve 30 in one direction, and an adjustable pin 39 which strikes against a lug 40 on the arm 10 limits the rotative movement of the sleeve 30 in the same direction.

The operation of the device may be simply described as follows:

The drum being in expanded or erected position and it being desired to collapse the drum, the crank 34 is rotated in a counterclockwise direction as the parts are shown in Figure 1. The first period of movement of the crank will move the key section 3 toward the axis of the core, the guide rods 20 moving in the guides 22 until the key section has cleared the end of the sections 1 and 2 as shown in Figure 2, whereupon the inward movement of the section 3 may be arrested by any desired means. In this movement the sleeve 24 and the sleeve 30 are rotated with respect to each other. The rotary movement of the crank may then be continued and the two sleeves 24 and 30 rotated in unison, whereupon the key section may be rotated in an arc about the axis of the core and be brought within the section 1. This position is shown in dotted lines in Figure 2, it being observed that the section 3 lies between the section 1 and the axis of the form, or it may be referred to as nested within the section 1. The key section is now completely removed from the range of the section 2 which may be swung inwardly as shown in Figure 3.

It will be noted that the key section is disposed of in a novel and useful manner and that in its position within the fixed section, all obstacles are removed from the path of the swinging section and it can be moved over to an extreme position not heretofore obtainable. This gives the maximum collapsing range which is the object of the present invention.

To re-erect the form, the section 2 is moved outwardly and the reverse movement of the crank brings the key section in alignment with the opening between the sections 2 and 3 and then a continued movement of the crank will project the key section to its original position. It will be understood that the drum may be held for rotation by suitable braking mechanism affixed to the shaft in the tire building machine while the collapsing and erecting operations are taking place. If the key section is at the top of the form when it is to be collapsed, the weight of the key section will assist in moving it toward the axis of the form. In re-erecting, if the key section is at the bottom of the form, the weight of the section will cause it to drop in place after it is brought in alignment. It will be observed that the stop 38 is so arranged and adjusted that the link will be slightly past center when the core is in erected position, which will tend to hold the form expanded.

The invention is applicable to various forms or cores for use in tire building operations and it is not confined to strict conformity with the details shown and described. The feature of revolving the key section about the form upon an arc located within the outer boundaries of the form is new and distinctive and may be applied in many relationships and is not necessarily restricted to association with the remaining details of the drum construction. It will be noted that when the separable or key section is moved to its position between the fixed sections and the axis of the form, it is completely out of the path of the swinging section which may be moved inwardly until the ends thereof are in contact or substantially in contact.

The invention is particularly valuable in the manufacture of drums having depressed bead seats and high central portions, which drums have been difficult to collapse with prior mechanisms. With the present design of collapsing mechanism, this type of drum can be collapsed without difficulty.

What is claimed is:

1. A tire building form comprising a plurality of sections, one of said sections being mounted independently of the other sections, and means to move the said section toward the axis of the form and about the form in an arc lying within the outer limits of the form.

2. A tire building form comprising a plurality of sections, one of said sections being movable radially toward and from its position in the erected form and circumferentially about the form.

3. A tire building form comprising a plurality of sections, one of said sections being a relatively fixed section and a movable section separable therefrom, and a rotatable mounting for the movable section, said movable section being movable radially of the form on the mounting and circumferentially of the form with the mounting.

4. A tire building form comprising a plurality of sections, one of said sections being a fixed section and a movable section separable therefrom, and means to move the last named section from a position at the side of the fixed section to a position between the fixed section and the axis of the form.

5. A tire building form comprising a plurality of sections, one of said sections being movable, and mechanism to move said section from a position at the outer periphery of the form to a position within the outer periphery of the form, and means included in said mechanism for then moving the section about the axis of the form in a circumferential arc.

6. A tire building form comprising a fixed section and a movable section, and a single mechanism to shift said movable section to a position between the fixed section and the axis of the form.

7. A collapsible tire building form comprising a fixed section, a section hinged to one end of the fixed section and a separable section at the other end of the fixed section, and mechanism to withdraw the separable section toward the axis of the form and shift it within the boundaries of the fixed section.

8. A collapsible tire building form comprising two sections hinged together and a separable section lying between the ends of the aforesaid sections when the form is erected, and a mounting for the separable section whereby it may be moved out of the path of the sections when they are brought together by swinging about the hinge.

9. A collapsible tire building form comprising two sections hinged together and a separable section lying between the ends of the hinged sections when the form is erected, a guide for the separable section in which it may move radially of the form, and a rotatable mounting for the guide upon which it may be revolved after the key section is moved toward the form axis.

10. In a collapsible tire building form, a hub at the axis of the form, a sleeve rotatably mounted upon the hub, guides in the sleeve, and a form section slidably mounted in the guides.

11. In a collapsible tire building form, a hub at the axis of the form, a sleeve rotatably mounted upon the hub, guides in the sleeve, a form section slidably mounted in the guides, an operating member rotatably mounted upon the hub, and a connection between the operating member and the form section.

12. In a collapsible tire building form, a hub at the axis of the form, a form section on the hub, a swinging section hinged to the end of the form section, a separable section between the said sections, a sleeve rotatable upon the hub, and means to move the separable section in the sleeve.

13. In a collapsible tire building form, a hub at the axis of the form, a form section on the hub, a swinging section hinged to the end of the form section, a separable section between the said sections, a sleeve rotatable upon the hub, and a single operating mechanism to move the separable section toward and from the axis of the form and about the hub.

14. In a collapsible tire building form, a hub at the axis of the form, a form section fixed to the hub, a second form section hinged to the first form section and a third form section separable therefrom, a rotary sleeve on the hub, and guides in the sleeve by which the third section is guided for movement toward and from the axis of the form.

15. In a collapsible tire building form, a hub at the axis of the form, a form section fixed to the hub, a second form section hinged to the first form section and a third form section separable therefrom, a rotary sleeve on the hub, guides in the sleeve by which the third section is guided for movement toward and from the axis of the form, a second rotary sleeve on the hub, and a link connecting the second sleeve and the third section.

16. In a collapsible tire building form, a key section movable toward and from the axis of the form, and about the axis of the form in an arc, and a single operating mechanism movable in one direction and connected to the key section to give both movements to the key section consecutively.

17. In a collapsible tire building form, two form sections which are side by side when the form is erected, means to move one of the sections in the plane of the forms to a position nested within the other section, and a third section movable toward and from the axis of the form.

18. In a collapsible tire building form, two form sections which are side by side when the form is erected, means to move one of the sections in the plane of the form to a position nested within the other section, and a third section hinged to the end of the other section.

19. A collapsible tire building form composed of a pair of hinged sections and a separable section, and means to withdraw the separable section and thereafter move it about the form in an arc lying within the outer periphery of the form.

ALLEN L. HESTON.